United States Patent
Zha

(10) Patent No.: US 10,353,238 B2
(45) Date of Patent: Jul. 16, 2019

(54) LIQUID CRYSTAL LENS AND 3D DISPLAY DEVICE

(71) Applicant: Wuhan China Star Optoelectronics Technology Co., Ltd., Wuhan (CN)

(72) Inventor: Guowei Zha, Wuhan (CN)

(73) Assignee: WUHAN CHINA STAR OPTOELECTRONICS TECHNOLOGY CO., LTD., Wuhan, Hubei (CN)

(*) Notice: Subject to any disclaimer, the term of this patent is extended or adjusted under 35 U.S.C. 154(b) by 199 days.

(21) Appl. No.: 15/107,924

(22) PCT Filed: Apr. 28, 2016

(86) PCT No.: PCT/CN2016/080449
§ 371 (c)(1),
(2) Date: Jun. 24, 2016

(87) PCT Pub. No.: WO2017/173687
PCT Pub. Date: Oct. 12, 2017

(65) Prior Publication Data
US 2018/0101054 A1 Apr. 12, 2018

(30) Foreign Application Priority Data
Apr. 8, 2016 (CN) .......................... 2016 1 0216952

(51) Int. Cl.
*G02F 1/1335* (2006.01)
*G02F 1/29* (2006.01)
*G02B 27/26* (2006.01)
*G02B 5/30* (2006.01)

(52) U.S. Cl.
CPC ....... *G02F 1/133528* (2013.01); *G02B 27/26* (2013.01); *G02F 1/133526* (2013.01); *G02F 1/29* (2013.01); *G02B 5/3058* (2013.01); *G02F 2001/133548* (2013.01); *G02F 2001/291* (2013.01)

(58) Field of Classification Search
None
See application file for complete search history.

(56) References Cited

U.S. PATENT DOCUMENTS

| 9,857,626 B1* | 1/2018 | Zha | G02F 1/133528 |
| 2002/0122235 A1* | 9/2002 | Kurtz | G02B 5/3058 359/254 |
| 2009/0273744 A1* | 11/2009 | Wang | G02B 5/3058 349/96 |

(Continued)

*Primary Examiner* — Ryan Crockett
(74) *Attorney, Agent, or Firm* — Leong C. Lei

(57) ABSTRACT

The present invention provides a liquid crystal lens and a 3D display device. By utilizing the metal wire grid (20) to realize the functions of electrode and polarizer at the same time, and the polarizer filters the o light to solve the display degradation issue due to the o light leakage, and corresponding high quality 3D image display is realized. By combining function of the polarizer and the electrode in the metal wire grid (20), the additional polarizer adhesion is no longer required, which can effectively decrease the thickness of the liquid crystal lens. The present invention further provides a 3D display device, which can decrease the thickness of the 3D display device to realize the high quality 3D image display.

16 Claims, 5 Drawing Sheets

(56) References Cited

U.S. PATENT DOCUMENTS

| | | | | |
|---|---|---|---|---|
| 2013/0038811 | A1* | 2/2013 | Sugita | G02B 27/22 |
| | | | | 349/61 |
| 2014/0347615 | A1* | 11/2014 | Oka | G02F 1/134309 |
| | | | | 349/139 |
| 2017/0293151 | A1* | 10/2017 | Zha | G02B 27/2214 |
| 2017/0316251 | A1* | 11/2017 | Li | G06K 9/00087 |

* cited by examiner

LIQUID CRYSTAL LENS AND 3D DISPLAY DEVICE

FIELD OF THE INVENTION

The present invention relates to a display technology field, and more particularly to a liquid crystal lens and a 3D display device.

BACKGROUND OF THE INVENTION

While the digital audio and video technology enters the high resolution time, the Three Dimension (3D) stereoscopic display technology has been drawn the attention and favor of the people data by day. The naked eye 3D technology gets rid of the complicated accessory equipments and goes over big. There are kinds of technologies to realize the naked eye 3D display, such as optical grating, liquid crystal lens, most of which at present is mainly based on special division of subpixels. Such method leads to the decreased 3D image resolution of the display panel in comparison with 2D panels. The 3D effect is totally far from perfection, suffering low image resolutions. Moreover, the adding 3D modules pose negative effect on the 2D display effect as well, which is totally unacceptable.

The principle of the liquid crystal lens is to utilize the birefringence of the liquid crystal molecules, and the director alignment distribution with the electrical field to make the light beam be focused or diffused. By changing the voltage to control the alignment direction of the liquid crystal molecules, and the corresponding effective refractive index distribution, the 3D display is realized. As shown in FIG. 1, which shows a structure diagram of a 3D display device according to prior art, comprising a display panel 8, and a liquid crystal lens located on the display panel 8. The liquid crystal lens comprises: an upper glass substrate 2 and a lower glass substrate 6, a liquid crystal layer 4 located between the upper glass substrate 2 and the lower glass substrate 6, a liquid crystal lens polarizer 1 located on one side of the upper glass substrate 2 away from the lower glass substrate 6, a common electrode 3 located on the upper glass substrate 2 close to the lower glass substrate 6, a plurality of strip lens electrodes 5 which are separately distributed on one side of the lower glass substrate 6 close to the upper glass substrate 2; the 3D display device applies various bias voltages to the plurality of strip lens electrodes 5 to make the liquid crystal molecules in the liquid crystal layer 4 have different tilt degrees, wherein the voltage at the border is higher, and the voltage in the middle is lower so that the refractive index of the liquid crystal layer 4 gradually decreases from the middle to the border to form the lens effect. The variation of the refractive index makes the liquid crystal layer 4 function as an optical lens to realize the 3D image display.

To obtain ideal display result, theoretically, it is required that the alignment direction of the liquid crystal molecules and the illuminating light polarization direction of the bottom liquid crystal display device are completely consistent, and thus to realize the complete extraordinary light (e light) 3D image. However, for reducing the influence of the Moire pattern to the display result, as shown in FIG. 2, the alignment of the liquid crystal lens relative to the display pixels is generally arranged to be tilted; and because the bias voltages of the various strip lens electrodes 5 are different, the transverse electrical field component can be easily formed among the strip lens electrodes 5, and the direction of the transverse component and the theoretical twist direction are not consistent, which results in that the liquid crystal molecules will deviate from the original alignment direction. Thus, the ordinary light (o light) 2D image of certain level will be formed. Due to the larger voltage variation at the border of the liquid crystal lens, such issue becomes more serious. The o light in the liquid crystal lens does not have the lens effect, and thus to have the 2D interference signal to reduce the 3D display result. Generally, for solving the issue, it is needed that the additive polarizer is adhered to the surface of the liquid crystal lens, again for filtering the o light (i.e. the liquid crystal lens polarizer 1), so that the liquid crystal lens thickness, of which it has been thick itself due to top and bottom glass structures, keeps increasing, and it is against the development trend for thinner display devices.

The metal wire grid is a periodic metal and dielectric layer arrangement structure, which has the extremely high extinction ratio for the Transverse Magnetic (TM) and the Transverse Electric (TE) and can obviously pass the TM light perpendicular with the metal wire alignment direction and reflect the TE light parallel with the metal wire alignment direction. Therefore, it can be used for an ideal polarizer. Because the thickness is merely at the nanometer scale and the manufacture process has been mature gradually, it draws lots of attentions.

SUMMARY OF THE INVENTION

An objective of the present invention is to provide a liquid crystal lens, which can decrease the thickness of the liquid crystal lens, diminish the o light leakage and realize the high quality 3D image display.

For realizing the aforesaid objectives, the present invention first provides a liquid crystal lens, comprising: an upper glass substrate, a lower glass substrate, which is oppositely located to the upper glass substrate, a metal wire grid located on one side of the upper glass substrate close to the lower glass substrate, a plurality of strip electrodes which are in parallel spaced arrangement on one side of the lower glass substrate close to the upper glass substrate, and a liquid crystal layer located between the lower glass substrate and the upper glass substrate;

the metal wire grid comprises a plurality of metal wires which are in parallel spaced arrangement, and a dielectric layer located under the plurality of metal wires which are in parallel spaced arrangement and on the upper glass substrate;

an extension direction of the plurality of metal wires is perpendicular with a polarization direction of an incident light of the liquid crystal lens, and an extension direction of the plurality of strip electrodes is different from either of the polarization direction of the incident light of the liquid crystal lens and the extension direction of the plurality of metal wires;

the metal wire grid possesses functions of electrode and polarizer at the same time.

A period of the metal wire grid is from 20 nanometer to 500 nanometer, and a duty ratio is from 0.1 to 0.9.

A width of the strip electrode is 10-1000 μm.

Material of the metal wire grid is aluminum, silver or gold.

Material of the dielectric layer is silicon dioxide, silicon monoxide, magnesium oxide, silicon nitride, titanium dioxide or tantalum pentoxide.

The present invention provides a 3D display device, comprising a display panel, a display panel polarizer located on the display panel, and a liquid crystal lens located on the display panel polarizer;

the liquid crystal lens comprises: an upper glass substrate, a lower glass substrate, which is oppositely located to the upper glass substrate, a metal wire grid located on one side of the upper glass substrate close to the lower glass substrate, a plurality of strip electrodes which are in parallel spaced arrangement on one side of the lower glass substrate close to the upper glass substrate, and a liquid crystal layer located between the lower glass substrate and the upper glass substrate;

the metal wire grid comprises a plurality of metal wires which are in parallel spaced arrangement, and a dielectric layer under between the plurality of metal wires which are in parallel spaced arrangement and on the upper glass substrate;

an extension direction of the plurality of metal wires is perpendicular with a polarization direction of an incident light of the display panel polarizer, and an extension direction of the plurality of strip electrodes is different from either of the polarization direction of the display panel polarizer and the extension direction of the plurality of metal wires;

the metal wire grid possesses functions of electrode and polarizer at the same time.

The display panel is an OLED display panel, or a LCD display panel.

The display panel polarizer is an absorption type polarizer.

A period of the metal wire grid is 20 nanometer to 500 nanometer, and a duty ratio is 0.1 to 0.9;

material of the metal wire grid is aluminum, silver or gold;

Material of the dielectric layer is silicon dioxide, silicon monoxide, magnesium oxide, silicon nitride, titanium dioxide or tantalum pentoxide.

A width of the strip electrode is 10-1000 μm.

The present invention further provides a liquid crystal lens, comprising: an upper glass substrate, a lower glass substrate, which is oppositely located to the upper glass substrate, a metal wire gate located on one side of the upper glass substrate close to the lower glass substrate, a plurality of strip electrodes which are in parallel spaced arrangement on one side of the lower glass substrate close to the upper glass substrate, and a liquid crystal layer located between the lower glass substrate and the upper glass substrate;

the metal wire grid comprises a plurality of metal wires which are in parallel spaced arrangement, and a dielectric layer located under the plurality of metal wires which are in parallel spaced arrangement and on the upper glass substrate;

an extension direction of the plurality of metal wires is perpendicular with a polarization direction of an incident light of the liquid crystal lens, and an extension direction of the plurality of strip electrodes is different from either of the polarization direction of the incident light of the liquid crystal lens and the extension direction of the plurality of metal wires;

the metal wire grid possesses functions of electrode and polarizer at the same time;

wherein a period of the metal wire grid is 20 nanometer to 500 nanometer, and a duty ratio is 0.1 to 0.9;

wherein a width of the strip electrode is 10-1000 μm.

The benefits of the present invention are: the present invention provides a liquid crystal lens. By utilizing the metal wire grid to realize the functions of electrode and polarizer at the same time, the polarizer filters the o light to solve the display degradation issue due to the o light leakage, and corresponding high quality 3D image display is realized. In comparison with prior art, by combining function of the polarizer and the electrode in the metal wire grid, the additional polarizer adhesion is no longer required, which can effectively decrease the thickness of the liquid crystal lens. The present invention further provides a 3D display device, which can decrease the thickness of the 3D display device to prevent the o light leakage and realize the high quality 3D image display.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
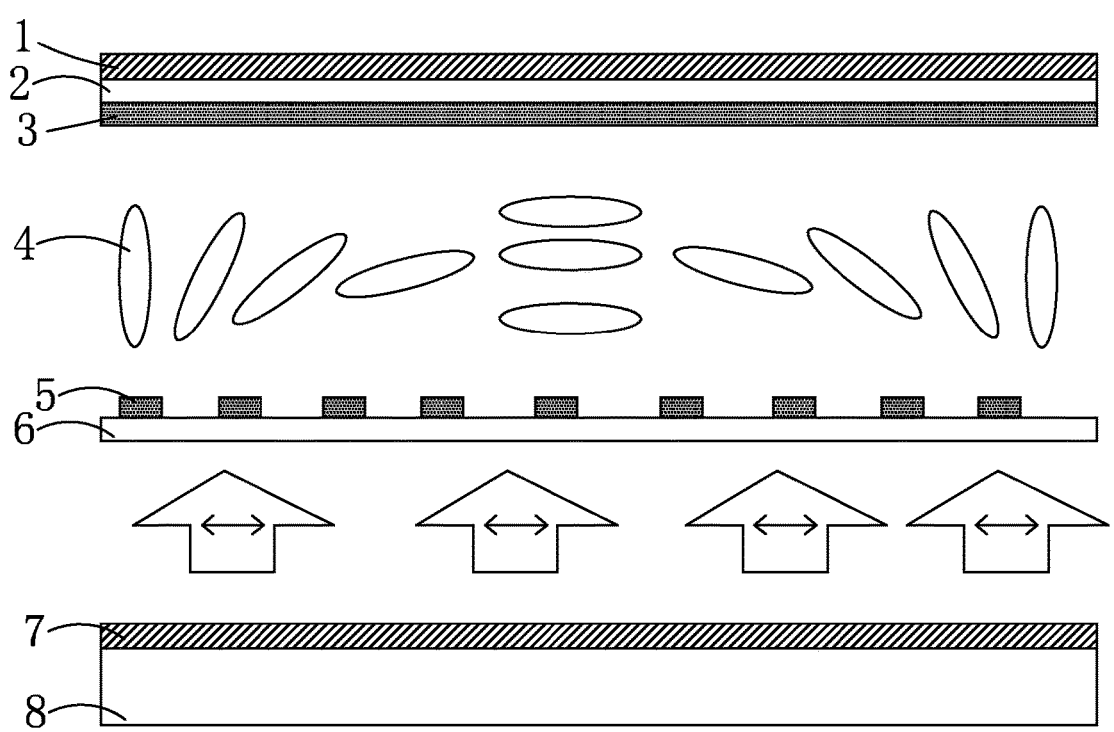
FIG. 1 is a structure diagram of a 3D display device according to prior art.
Figure 2:
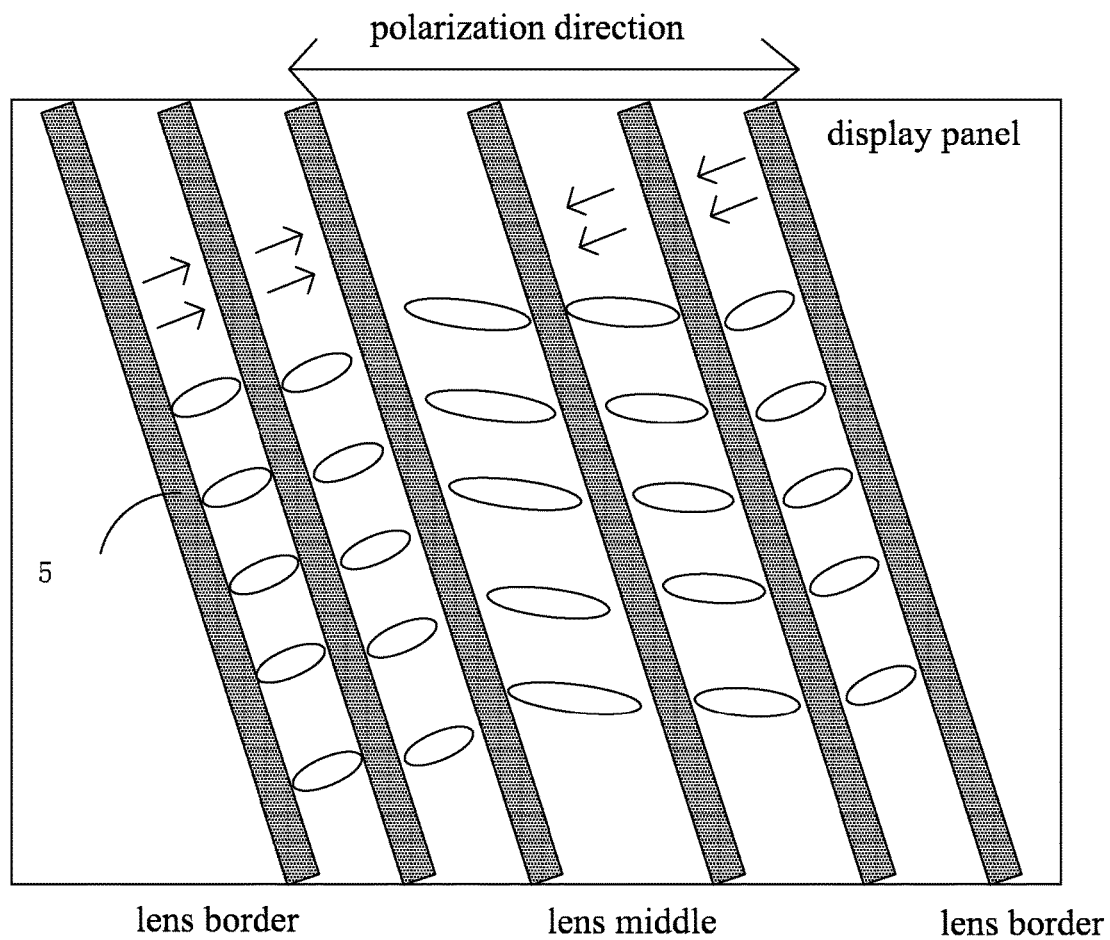
FIG. 2 is a top view diagram of the strip lens electrode in the 3D display device shown in FIG. 1.
Figure 3:
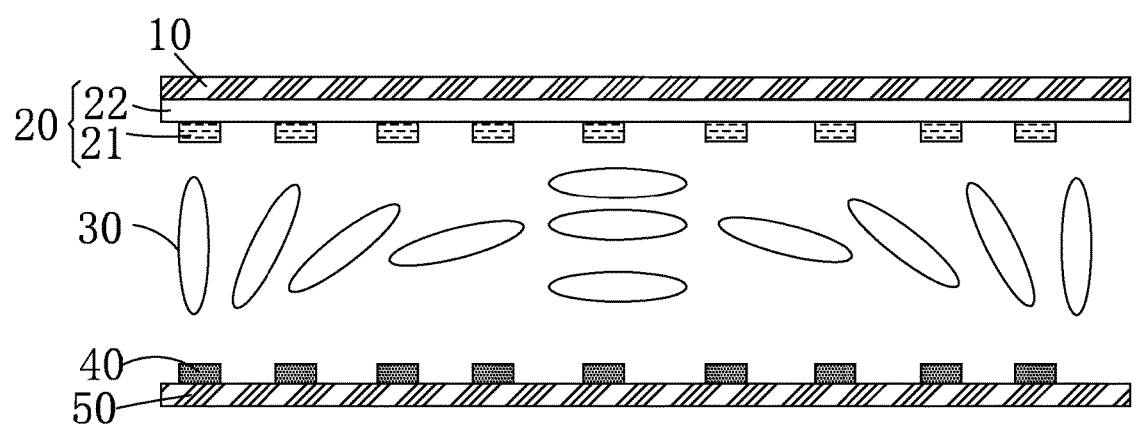
FIG. 3 is a structure diagram of the liquid crystal lens of the present invention.

Please refer to FIG. 3. The present invention first provides a liquid crystal lens, comprising: an upper glass substrate 10, a lower glass substrate 50, which is oppositely located to the upper glass substrate 10, a metal wire grid 20 located on one side of the upper glass substrate 10 close to the lower glass substrate 50, a plurality of strip electrodes 40 which are in parallel spaced arrangement on one side of the lower glass substrate 50 close to the upper glass substrate 10, and a liquid crystal layer 30 located between the lower glass substrate 50 and the upper glass substrate 10.

Specifically, the metal wire grid 20 comprises a plurality of metal wires 21 which are in parallel spaced arrangement, and a dielectric layer 22 located under the plurality of metal wires 21 which are in parallel spaced arrangement and on the upper glass substrate 10, and the metal wire grid 20 possesses functions of electrode and polarizer at the same time.

Figure 4:
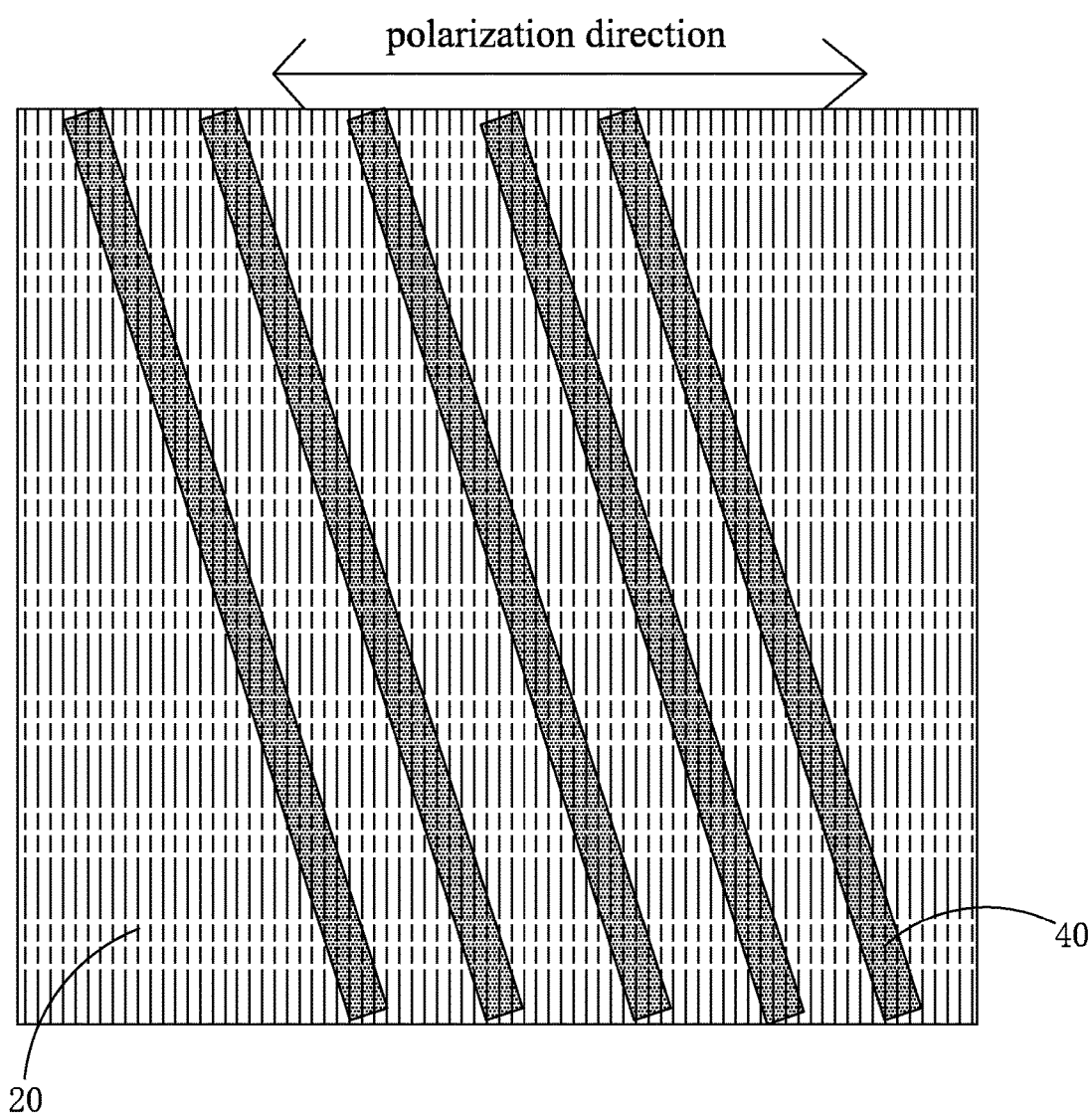
FIG. 4 is a top view diagram of the metal wire grid and the strip electrode in the liquid crystal lens of the present invention.

Furthermore, referring to FIG. 4, an extension direction of the plurality of metal wires 21 is perpendicular with a polarization direction of an incident light of the liquid crystal lens, and the metal wire grid 20 can pass the TM light of which the polarization direction is perpendicular with the extension direction of the metal wire 21, and reflect the TE light of which the polarization direction is parallel with the extension direction of the metal wire 21 to realize the function of filtering the o light. The extension direction of the plurality of strip electrodes 40 is different from either of the polarization direction of the incident light of the liquid crystal lens and the extension direction of the plurality of metal wires 21. Namely, the plurality of strip electrodes 40 and the polarization direction of the incident light form an included angle smaller than 90 degree to avoid the appearance of the Moire pattern.

Specifically, the polarization of the metal wire grid 20 is due to the asymmetry as the TM light and the TE light pass through the metal wire grid 20. The TM light of which the polarization direction is perpendicular with the extension direction of the metal wires 21 can pass, and the TE light of which the polarization direction is parallel with the extension direction of the metal wires 21 will be reflected, and the polarization property and the effective wavelength band of the metal wire grid 20 can be determined by changing the structure parameters of the metal wire grid 20, i.e. by adjusting the period and the duty ratio of the metal wire grid 20, wherein the period of the metal wire grid 20 means the distance between the left side and the left side of the adjacent metal wires 21, and the duty ratio is the ratio of the width and the period of the metal wires 21. Preferably, the period of the metal wire grid 20 is 20 nanometer to 500 nanometer, and the duty ratio is 0.1 to 0.9.

Specifically, the width and gap of the plurality of strip electrodes 40 can be equal or can be not equal. The specific width selected range is 10-1000 μm.

Specifically, the material of the metal wire grid 20 requires the larger imaginary part of refractivity. Preferably, the material of the metal wire grid polarizer 20 is aluminum (Al), silver (Ag) or gold (Au). Material of the dielectric layer 22 is silicon dioxide ($SiO_2$), silicon monoxide (SiO), magnesium oxide (MgO), silicon nitride ($Si_3N_4$), titanium dioxide ($TiO_2$) or tantalum pentoxide ($Ta_2O_5$). As selecting the liquid crystal molecules in the liquid crystal layer 30, the liquid crystal molecules, of which the refractivity difference of the e light and the o light is higher, are preferred for convenience to decrease the thickness of the liquid crystal lens.

Besides, the liquid crystal lens further comprises an alignment layer on one side of the lens lower glass substrate 50 close to the liquid crystal layer 30.

Specifically, the working process of the liquid crystal lens is: an incident light is provided. The light enters the liquid crystal lens from the lower part of the lower glass substrate 50 of the liquid crystal lens, and the incident light is a polarized light, of which the polarization direction is perpendicular with the extension direction of the plurality of metal wires 21, and the voltages are applied to the strip electrodes 40 and the metal wires 20 to twist the liquid crystal molecules in the liquid crystal layer 30, wherein the voltage of the strip electrodes 40 at the border is higher, and the voltage of the strip electrodes 40 in the middle is lower. The refractivity of the liquid crystal layer 30 gradually decreases from the middle to the border to form the lens effect. The variation of the refractivity makes the incident light be focused to a predetermined direction as penetrating through the liquid crystal layer 30, and the o light generated by the incident light due to birefraction will be filtered by the metal wire grid 20, and thus to prevent the interference of the o light to realize the 3D image display.

Significantly, in the working process of the liquid crystal lens, the voltage applied to the plurality of metal wires 21 of the metal wire grid 20 can be the same, and can be different. Because the size of the metal wires 21 is very small relative to the strip electrodes 40 located on the lower glass substrate, as applying the same voltage thereto for forming the common electrode, the liquid crystal molecules twist result is not obviously different from that of the whole plate shape common electrode according to prior art, but the twist result of the liquid crystal molecules can be even optimized while applying different voltages thereto for enhancing the 3D image display quality.

Figure 5:
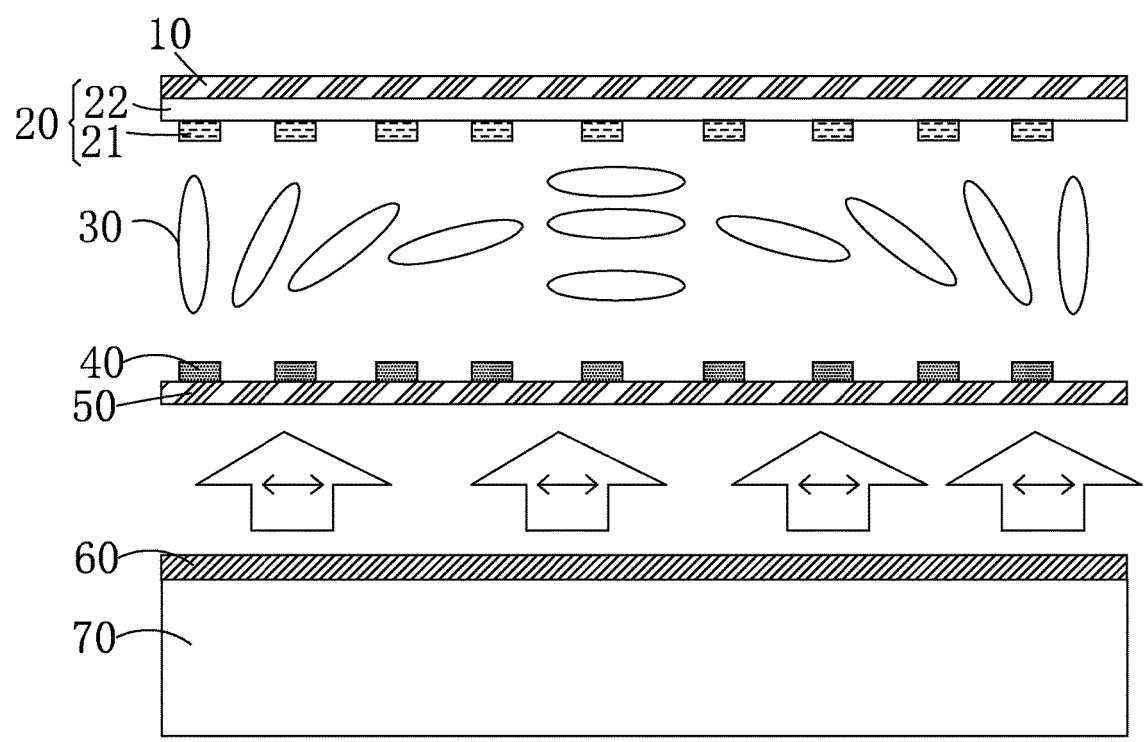
FIG. 5 is a structure diagram of the 3D display device according to the present invention.

Please refer to FIG. 5. The present invention further provides a 3D display device, comprising a display panel 70, a display panel polarizer 60 located on the display panel, and a liquid crystal lens located on the display panel polarizer 60.

Specifically, the display panel 70 is a Liquid Crystal Display (LCD), or an Organic Light Emitting Display (OLED).

Specifically, the display panel polarizer 60 can be an absorption type polarizer. Certainly, the display panel polarizer 60 also can be the polarizer of other type, such as a metal wire grid, a brightness enhancement film, and etc. The liquid crystal lens contacts with the display panel polarizer 60 through the adhesive layer. The display panel polarizer 60 in the display panel is employed to construct the light valve function with the lower polarizer, together and employed to form polarized light in the 3D display device to realize the e light 3D display.

Specifically, the liquid crystal lens, comprising: an upper glass substrate 10, a lower glass substrate 50, which is oppositely located to the upper glass substrate 10, a metal wire grid 20 located on one side of the upper glass substrate 10 close to the lower glass substrate 50, a plurality of strip electrodes 40 which are in parallel spaced arrangement on one side of the lower glass substrate 50 close to the upper glass substrate 10, and a liquid crystal layer 30 located between the lower glass substrate 50 and the upper glass substrate 10.

Specifically, the metal wire grid 20 comprises a plurality of metal wires 21 which are in parallel spaced arrangement, and a dielectric layer 22 located under the plurality of metal wires 21 which are in parallel spaced arrangement and on the upper glass substrate 10, and the metal wire grid 20 possesses functions of electrode and polarizer at the same time.

Furthermore, referring to FIG. 4, an extension direction of the plurality of metal wires 21 is perpendicular with a polarization direction of an incident light of the liquid crystal lens, and the metal wire grid 20 can pass the TM polarized light of which the polarization direction is perpendicular with the extension direction of the metal wire 21, and reflect the TE polarized light of which the polarization direction is parallel with the extension direction of the metal wire 21 to realize the function of filtering the o light. The extension direction of the plurality of strip electrodes 40 is different from either of the polarization direction of the incident light of the liquid crystal lens and the extension direction of the plurality of metal wires 21. Namely, the plurality of strip electrodes 40 and the polarization direction of the display panel polarizer 60 form an included angle smaller than 90 degree to avoid the appearance of the Moire pattern.

Specifically, the polarization of the metal wire grid 20 is due to the asymmetry as the TM light and the TE light pass through the metal wire grid 20. The TM light of which the polarization direction is perpendicular with the extension direction of the metal wires 21 can pass, and the TE light of which the polarization direction is parallel with the extension direction of the metal wires 21 will be reflected, and the polarization property and the effective wavelength band of the metal wire grid 20 can be determined by changing the structure parameters of the metal wire grid 20, i.e. by adjusting the period and the duty ratio of the metal wire grid 20, wherein the period of the metal wire grid 20 means the distance between the left side and the left side of the adjacent metal wires 21, and the duty ratio is the ratio of the width and the period of the metal wires 21. Preferably, the period of the metal wire grid 20 is 20 nanometer to 500 nanometer, and the duty ratio is 0.1 to 0.9.

Specifically, the width and gap of the plurality of strip electrodes 40 can be equal or can be not equal. The specific width selected range is 10-1000 μm.

Specifically, the material of the metal wire grid 20 requires the larger imaginary part of refractivity. Preferably, the material of the metal wire grid polarizer 20 is aluminum, silver or gold. Material of the dielectric layer 22 is silicon dioxide, silicon monoxide, magnesium oxide, silicon nitride, titanium dioxide or tantalum pentoxide. As selecting the liquid crystal molecules in the liquid crystal layer 30, the liquid crystal molecules, of which the refractivity difference of the e light and the o light is higher, are preferred for convenience to decrease the thickness of the liquid crystal lens.

Besides, the liquid crystal lens further comprises an alignment layer on one side of the lens lower glass substrate 50 close to the liquid crystal layer 30, which is employed to implement alignment to the liquid crystal molecules in the liquid crystal layer 30.

Specifically, the working process of the 3D display device is: the display penal 70 emits light. The light is filtered by the display panel polarizer 60 to form a polarized light, and the polarization direction is perpendicular with the extension direction of the plurality of metal wires 21. The polarized light enters the liquid crystal lens from the lower part of the lower glass substrate 50 of the liquid crystal lens, and the voltages are applied to the strip electrodes 40 and the metal wires 20 to twist the liquid crystal molecules in the liquid crystal layer 30, wherein the voltage of the strip electrodes 40 at the border is higher, and the voltage of the strip electrodes 40 in the middle is lower. The refractivity of the liquid crystal layer 30 gradually decreases from the middle to the border to form the lens effect. The variation of the refractivity makes the incident light be focused to a predetermined direction as penetrating through the liquid crystal layer 30, and the o light generated by the incident light due to birefraction will be filtered by the metal wire grid 20, and thus to prevent the interference of the o light to realize the 3D image display.

Significantly, in the working process of the 3D display device, the voltage applied to the plurality of metal wires 21 of the metal wire grid 20 can be the same, and can be different. Because the size of the metal wires 21 is very small relative to the strip electrodes 40 located on the lower glass substrate, as applying the same voltage thereto for forming the common electrode, the liquid crystal molecules twist result is not obviously different from that of the whole plate shape common electrode according to prior art, but the twist result of the liquid crystal molecules can be even optimized while applying different voltages thereto for enhancing the 3D image display quality.

In conclusion, the present invention provides a liquid crystal lens. By utilizing the metal wire grid to realize the functions of electrode and polarizer at the same time, and the polarizer filters the o light to solve the display degradation issue due to the o light leakage, and corresponding high quality 3D image display is realized. In comparison with prior art, by combining function of the polarizer and the electrode in the metal wire grid, the additional polarizer adhesion is no longer required, which can effectively decrease the thickness of the liquid crystal lens. The present invention further provides a 3D display device, which can decrease the thickness of the 3D display device to prevent the o light leakage and realize the high quality 3D image display.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal lens, comprising: an upper glass substrate, a lower glass substrate, which is oppositely located to the upper glass substrate, a metal wire grid located on one side of the upper glass substrate close to the lower glass substrate, a plurality of strip electrodes which are in parallel spaced arrangement on one side of the lower glass substrate close to the upper glass substrate, and a liquid crystal layer located between the lower glass substrate and the upper glass substrate;

wherein the metal wire grid comprises a plurality of metal wires which are in parallel spaced arrangement, and a dielectric layer located under the plurality of metal wires which are in parallel spaced arrangement and on the upper glass substrate;

an extension direction of the plurality of metal wires is perpendicular with a polarization direction of incident light of the liquid crystal lens, and an extension direction of the plurality of strip electrodes is different from either one of the polarization direction of the incident light of the liquid crystal lens and the extension direction of the plurality of metal wires, and a refractivity of the liquid crystal layer gradually decreases from middle to border of the liquid crystal layer to form a lens effect to focus an incident light to be focused to a predetermined direction and to filter an ordinary light generated by incident light due to birefraction by the metal wire grid; and the metal wire grid possesses functions of electrode and polarizer at the same time, wherein the metal wires of the metal wire grid functions as an electrode that receives application of a voltage between the metal wire grid and the plurality of strip electrodes to re-direct the incident light to transmit through the liquid crystal between the metal wire grid and the strip electrodes and functions as a polarizer to polarize the re-directed light that transmits through the liquid crystal between the metal wire grid and the strip electrodes.

2. The liquid crystal lens according to claim 1, wherein a period of the metal wire grid is from 20 nanometer to 500 nanometer, and a duty ratio is from 0.1 to 0.9.

3. The liquid crystal lens according to claim 1, wherein a width of the strip electrode is 10-1000 μm.

4. The liquid crystal lens according to claim 1, wherein a material of the metal wire grid is aluminum, silver or gold.

5. The liquid crystal lens according to claim 1, wherein a material of the dielectric layer is silicon dioxide, silicon monoxide, magnesium oxide, silicon nitride, titanium dioxide or tantalum pentoxide.

6. The liquid crystal lens according to claim 1, wherein the voltage applied between the metal wire grid and the plurality of strip electrodes is different among the metal wires of the metal wire grid.

7. A 3D display device, comprising a display panel, a display panel polarizer located on the display panel, and a liquid crystal lens located on the display panel polarizer;

wherein the liquid crystal lens comprises: an upper glass substrate, a lower glass substrate, which is oppositely located to the upper glass substrate, a metal wire grid located on one side of the upper glass substrate close to the lower glass substrate, a plurality of strip electrodes which are in parallel spaced arrangement on one side of the lower glass substrate close to the upper glass substrate, and liquid crystal layer located between the lower glass substrate and the upper glass substrate;

the metal wire grid comprises a plurality of metal wires which are in parallel spaced arrangement, and dielectric layer located under the plurality of metal wires which are in parallel spaced arrangement and on the upper glass substrate;

an extension direction of the plurality of metal wires is perpendicular with a polarization direction of incident light of the display panel polarizer, and an extension direction of the plurality of strip electrodes is different from either one of the polarization direction of the display panel polarizer and the extension direction of the plurality of metal wires, and a refractivity of the liquid crystal layer gradually decreases from middle to border of the liquid crystal layer to form a lens effect to focus an incident light to be focused to a predetermined direction and to filter an ordinary light generated by incident light due to birefraction by the metal wire grid; and the metal wire grid possesses functions of electrode and polarizer at the same time, wherein the metal wires of the metal wire grid functions as an electrode that receives application of a voltage between the metal wire grid and the plurality of strip electrodes to re-direct the incident light to transmit through the liquid crystal between the metal wire grid and the strip electrodes and functions as a polarizer to polarize the re-directed light that transmits through he liquid crystal between the metal wire grid and the strip electrodes.

8. The 3D display device according to claim 7, wherein the display panel is an OLED display panel, or a LCD display panel.

9. The 3D display device according to claim 7, wherein the display panel polarizer is an absorption type polarizer.

10. The 3D display device according to claim 7, wherein a period of the metal wire grid is from 20 nanometer to 500 nanometer, and a duty ratio is from 0.1 to 0.9;
a material of the metal wire grid is aluminum, silver or gold; and
a material of the dielectric layer is silicon dioxide, silicon monoxide, magnesium oxide, silicon nitride, titanium dioxide or tantalum pentoxide.

11. The 3D display according to claim 7, wherein a width of the strip electrode is 10-1000 µm.

12. The 3D display device according to claim 7, wherein the voltage applied between the metal wire grid and the plurality of strip electrodes is different among the metal wires of the metal wire grid.

13. A liquid crystal lens, comprising: an upper glass substrate, a lower glass substrate, which is oppositely located to the upper glass substrate, a metal wire grid located on one side of the upper glass substrate close to the lower glass substrate, a plurality of strip electrodes which are in parallel spaced arrangement on one side of the lower glass substrate close to the upper glass substrate, and a liquid crystal layer located between the lower glass substrate and the upper glass substrate;

wherein the metal wire grid comprises a plurality of metal wires which are in parallel spaced arrangement, and a dielectric layer located under the plurality of metal wires which are in parallel spaced arrangement and on the upper glass substrate;

an extension direction of the plurality of metal wires is perpendicular with a polarization direction of incident light of the liquid crystal lens, and an extension direction of the plurality of strip electrodes is different from either one of the polarization direction of the incident light of the liquid crystal lens and the extension direction of the plurality of metal wires, and a refractivity of the liquid crystal layer gradually decreases from middle to border of the liquid crystal layer to form a lens effect to focus an incident light to be focused to a predetermined direction and to filter an ordinary light generated by incident light due to birefraction by the metal wire grid; and the metal wire grid possesses functions of electrode and polarizer at the same time, wherein the metal wires of the metal wire grid functions as an electrode that receives application of a voltage between the metal wire grid and the plurality of strip electrodes to re-direct the incident light to transmit through the liquid crystal between the metal wire grid and the strip electrodes and functions as a polarizer to polarize the re-directed light that transmits through the liquid crystal between the metal wire grid and the strip electrodes;

wherein a period of the metal wire grid is from 20 nanometer to 500 nanometer, and a duty ratio is from 0.1 to 0.9; and wherein a width of the strip electrode is 10-1000 µm.

14. The liquid crystal lens according to claim 13, wherein a material of the metal wire grid is aluminum, silver or gold.

15. The liquid crystal lens according to claim 13, wherein a material of the dielectric layer is silicon dioxide, silicon monoxide, magnesium oxide, silicon nitride, titanium dioxide or tantalum pentoxide.

16. The liquid crystal lens according to claim 13, wherein the voltage applied between the metal wire grid and the plurality of strip electrodes is different among the metal wires of the metal wire grid.

* * * * *